United States Patent
Winterling et al.

(10) Patent No.: US 7,666,976 B2
(45) Date of Patent: Feb. 23, 2010

(54) POLYAMIDES

(75) Inventors: Helmut Winterling, Ludwigshafen (DE); Jürgen Demeter, Ludwigshafen (DE); Jürgen Deininger, Oftersheim (DE); Gad Kory, Gaiberg (DE); Oliver Sötje, Mannheim (DE); Axel Wilms, Weisenheim (DE); Robert Weiβ, Kirchheim (DE); Kurt Krempel, Rödersheim-Gronau (DE); Christoph Benisch, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 240 days.

(21) Appl. No.: 10/556,392

(22) PCT Filed: May 6, 2004

(86) PCT No.: PCT/EP2004/004817

§ 371 (c)(1),
(2), (4) Date: Nov. 10, 2005

(87) PCT Pub. No.: WO2004/101648

PCT Pub. Date: Nov. 25, 2004

(65) Prior Publication Data
US 2006/0223974 A1 Oct. 5, 2006

(30) Foreign Application Priority Data
May 14, 2003 (DE) ................... 103 21 788

(51) Int. Cl.
*C08G 69/08* (2006.01)
(52) U.S. Cl. .................... 528/310; 528/323; 528/324; 528/325; 528/326; 528/327; 528/330
(58) Field of Classification Search ................ 528/310, 528/323–327, 330
See application file for complete search history.

(56) References Cited

U.S. PATENT DOCUMENTS

| | | | | | |
|---|---|---|---|---|---|
| 3,859,329 | A | * | 1/1975 | Lambert et al. | 558/456 |
| 3,950,229 | A | * | 4/1976 | Moore et al. | 203/38 |
| 4,739,035 | A | * | 4/1988 | Shyu et al. | 528/335 |
| 5,639,819 | A | | 6/1997 | Farkas et al. | |
| 6,075,117 | A | * | 6/2000 | Hayes et al. | 528/332 |
| 6,094,816 | A | | 8/2000 | Doshi | |
| 6,117,942 | A | * | 9/2000 | Ogo et al. | 525/66 |
| 6,278,023 | B1 | * | 8/2001 | Voit et al. | 564/492 |
| 6,297,394 | B1 | * | 10/2001 | Voit et al. | 558/459 |
| 6,359,178 | B1 | * | 3/2002 | Fischer et al. | 564/492 |
| 6,569,988 | B1 | * | 5/2003 | Mohrschladt et al. | 528/310 |
| 6,958,381 | B2 | * | 10/2005 | Winterling et al. | 528/322 |

FOREIGN PATENT DOCUMENTS

| | | |
|---|---|---|
| EP | 0083907 | 12/1982 |
| WO | WO 02/42357 * | 5/2002 |

OTHER PUBLICATIONS

Encylclopedia of Pol. Sci and Tech Polyamides, fibers, vol. 3, p. 592-594, 2001.*
International Search Report No. PCT/EP2004/004817, dated Aug. 10, 2004, 3 pages.

* cited by examiner

*Primary Examiner*—James Seidleck
*Assistant Examiner*—Gregory Listvoyb
(74) *Attorney, Agent, or Firm*—Connolly Bove Lodge & Hutz LLP

(57) ABSTRACT

Polyamide, whose main chain contains a chemically bound amine selected from the group consisting of 2-methyl-1,5-diaminopentane and 1-amino-2-R-cyclopent-1-ene, where R is a functional group capable of combining with an amino group to form an amide group,
and processes for preparing such a polyamide and fibers, films and moldings comprising such a polyamide.

13 Claims, No Drawings

POLYAMIDES

This application claims priority from PCT/EP04/004918 filed May 6, 2004 and German Application DE 103 21 788.6 filed May 14, 2003, the disclosures of each application are incorporated herein by reference.

The present invention relates to a polyamide whose main claim contains a chemically bound amine selected from the group consisting of 2-methyl-1,5-diaminopentane and 1-amino-2-R-cyclopent-1-ene, where R is a functional group capable of combining with an amino group to form an amide group, or mixtures thereof.

The present invention further relates to a process for preparing such a polyamide and also to fibers, films and moldings comprising at least one such polyamide.

Polyamides, especially nylon-6 and nylon-6,6, are industrially important polymers. They are typically prepared from suitable monomers, such as caprolactam, adipic acid or hexamethylenediamine, which are reacted in the presence of water.

Polyamide polymers are typically shaped, for example into fibers, films or moldings.

Such fibers or textile entities manufactured therefrom, such as apparel or carpet, films or moldings are then typically dyed. This can be accomplished for example by means of dyebaths in the case of fibers or textile entities manufactured therefrom or by printing in the case of textile entities, films or moldings.

It is desirable for the polyamide to have a high rate of dyeing in order that a high rate of processing may be achieved.

It is an object of the present invention to provide a polyamide which has a higher rate of dyeing than prior art polyamides and also a process for preparing such a polyamide.

We have found that this object is achieved by the polyamide defined at the beginning, a process for preparing it and also fibers, films and moldings comprising at least one such polyamide.

Polyamides are herein to be understood as being homopolymers, copolymers, blends and grafts of synthetic long-chain polyamides having recurring amide groups in the polymer main chain as an essential constituent. Examples of such polyamides are nylon-6 (polycaprolactam), nylon-6,6 (polyhexamethyleneadipamide), nylon-4,6 (polytetramethyleneadipamide), nylon-6,10 (polyhexamethylenesebacamide), nylon-7 (polyenantholactam), nylon-11 (poly-undecanolactam), nylon-12 (polydodecanolactam). As well as polyamides known by the generic name of nylon, polyamides further include the aramids (aromatic polyamides), such as poly-meta-phenyleneisophthalamide (NOMEX® fiber, U.S. Pat. No. 3,287,324) or poly-para-phenyleneterephthalamide (KEVLAR® fiber, U.S. Pat. No. 3,671,542).

Polyamides can in principle be prepared by two methods.

In a polymerization from dicarboxylic acids and diamines and also in a polymerization from amino acids or their derivatives, such as aminocarbonitriles, aminocarboxamides, aminocarboxylate esters or aminocarboxylate salts, the amino and carboxyl end groups of the starting monomers or starting oligomers react with one another to form an amide group and water. The water can subsequently be removed from the polymer. In a polymerization from aminocarboxamides, the amino and amide end groups of the starting monomers or starting oligomers react with one another to form an amide group and ammonia. The ammonia can subsequently be removed from the polymer. When aminocarboxylic esters are polymerized, the amino and ester end groups of the starting monomers or oligomers react with each other to form an amide group and alcohol. The alcohol can subsequently be removed from the polymer mass. In the polymerization of aminocarboxylic nitriles, the nitrile groups can first react with water to form amid or carboxyl groups and the resulting aminocarboxylic amides or acids reacted as described. This polymerization reaction is customarily known as a polycondensation.

A polymerization from lactams as starting monomers or starting oligomers is customarily known as a polyaddition.

Such polyamides are obtainable by conventional processes, as described for example in DE-A-14 95 198, DE-A-25 58 480, EP-A-129 196 or in: Polymerization Processes, Interscience, New York, 1977, pages 424-467, especially pages 444-446, from monomers selected from the group consisting of lactams, omega-aminocarboxylic acids, omega-aminocarbonitriles, omega-aminocarboxamides, omega-aminocarboxylate salts, omega-aminocarboxylate esters, equimolar mixtures of diamines and dicarboxylic acids, dicarboxylic acid/diamine salts, dinitriles and diamines or mixtures thereof.

Useful Monomers Include monomers or oligomers of a $C_2$ to $C_{20}$, preferably $C_2$ to $C_{18}$, arylaliphatic or, preferably, aliphatic lactam such as enantholactam, undecanolactam, dodecanolactam or caprolactam, monomers or oligomers of $C_2$ to $C_{20}$, preferably $C_3$ to $C_{18}$, aminocarboxylic acids such as 6-aminocaproic acid or 11-aminoundecanoic acid, and salts thereof such as alkali metal salts, for example lithium, sodium or potassium salts, monomers or oligomers of $C_2$ to $C_{20}$, preferably $C_3$ to $C_{18}$, aminocarbonitriles such as 6-aminocapronitrile or 11-aminoundecanonitrile, monomers or oligomers of $C_2$ to $C_{20}$ amino acid amides such as 6-aminocapronamide or 11-aminoundecanomide, esters, preferably $C_1$-$C_4$ alkyl esters, such as methyl, ethyl, n-propyl, i-propyl, n-butyl, i-butyl or s-butyl esters, of $C_2$ to $C_{20}$, preferably $C_3$ to $C_{18}$, aminocarboxylic acids, such as 6-aminocaproic acid esters, for example methyl 6-aminocaproate, or 11-aminoundecanoic acid esters, for example methyl 11-aminoundecanoate, monomers or oligomers of a $C_2$ to $C_{20}$, preferably $C_2$ to $C_{12}$, alkyldiamine, such as tetramethylenediamine or, preferably, hexamethylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decanoic acid 1,10-dinitrile or adiponitrile, monomers or oligomers of a $C_2$ to $C_{20}$, preferably $C_2$ to $C_{12}$, alkyldiamine, such as tetramethylenediamine or, preferably, hexamethylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, monomers or oligomers of a $C_2$ to $C_{20}$, preferably $C_2$ to $C_{12}$, alkyldiamine, such as tetramethylenediamine or, preferably, hexamethylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, monomers or oligomers of a $C_6$ to $C_{20}$, preferably $C_6$ to $C_{10}$, aromatic diamine, such as m- or p-phenylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decane-1,10-dinitrile or adiponitrile, monomers or oligomers of a $C_6$ to $C_{20}$, preferably $C_6$ to $C_{10}$, aromatic diamine, such as m- or p-phenylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, monomers or oligomers of a $C_6$ to $C_{20}$, preferably $C_6$ to $C_{10}$, aromatic diamine, such as m- or p-phenylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, monomers or oligomers of a $C_7$ to $C_{20}$, preferably $C_8$ to $C_{18}$, arylaliphatic diamine, such as m- or p-xylylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decane-1,10-dinitrile or adiponitrile, monomers or oligomers of a $C_7$ to $C_{20}$, preferably $C_8$ to $C_{18}$, arylaliphatic diamine, such as m- or p-xylylenediamine, with a $C_6$ to $C_{20}$, preferably $C_6$ to $C_{10}$, aromatic dicarboxylic acid or derivatives thereof, for example chlorides, such as naphthalene-2,6-dicarboxylic acid, preferably isophthalic acid or terephthalic acid, monomers or oligomers of a $C_7$ to $C_{20}$, preferably $C_8$ to $C_{18}$, arylaliphatic diamine, such as m- or p-xylylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and homopolymers, copolymers, blends and grafts of such starting monomers or starting oligomers.

Useful oligomers include, in particular, the dimers, trimers, tetramers, pentamers or hexamers of said monomers or of mixtures of such monomers.

In a preferred embodiment, the lactam used is caprolactam, the diamine used is tetramethylenediamine, hexamethylenediamine or their mixtures and the dicarboxylic acid used is adipic acid, sebacic acid, dodecanedioic acid, terephthalic acid, isophthalic acid or mixtures thereof. Particular preference is given to the lactam being caprolactam, the diamine being hexamethylenediamine and the dicarboxylic acid being adipic acid or terephthalic acid or their mixtures.

Particular preference is given to those starting monomers or starting oligomers which on polymerization lead to the polyamides nylon-6, nylon-6,6, nylon-4,6, nylon-6,10, nylon-6,12, nylon-7, nylon-11 or nylon-12 or the aramids poly-meta-phenyleneisophthalamide or poly-para-phenyleneterephthalamide, especially to nylon-6 or nylon-6,6.

In a preferred embodiment, the polyamides may be prepared using one or more chain regulators. Useful chain regulators advantageously include compounds having one or more, such as two, three or four, preferably two in the case of systems in the form of fibers, amino groups reactive in polyamide formation or one or more, such as two, three or four, preferably two in the case of systems in the form of fibers, carboxyl groups reactive in polyamide formation.

The first case provides polyamides wherein the monomers and chain regulators used for preparing said polyamide have a higher number of amino groups, or their equivalents, used for forming said polymer chain than carboxylic acid groups, or their equivalents, used for forming said polymer chain.

The second case provides polyamides wherein the monomers and chain regulators used for preparing said polyamide have a higher number of carboxylic acid groups, or their equivalents, used for forming said polymer chain than amino groups, or their equivalents, used for forming said polymer chain.

Useful chain regulators advantageously include monocarboxylic acids, such as alkanecarboxylic acids, for example acetic acid, propionic acid, such as benzene- or naphthalene-monocarboxylic acid, for example benzoic acid, dicarboxylic acids, such as $C_4$-$C_{10}$-alkanedicarboxylic acid, for example adipic acid, azelaic acid, sebacic acid, dodecanedioic acid, $C_5$-$C_8$-cycloalkanedicarboxylic acids, for example cyclohexane-1,4-dicarboxylic acid, benzene- or naphthalenedicarboxylic acid, for example terephthalic acid, isophthalic acid, naphthalene-2,6-dicarboxylic acid, $C_2$ to $C_{20}$, preferably $C_2$ to $C_{12}$, alkylamines, such as cyclohexylamine, $C_6$ to $C_{20}$, preferably $C_6$ to $C_{10}$, aromatic monoamines, such as aniline, or $C_7$ to $C_{20}$, preferably $C_8$ to $C_{18}$, arylaliphatic monoamines, such as benzylamine, diamines, such as $C_4$-$C_{10}$-alkanediamines, for example hexamethylenediamine.

The chain regulators may be unsubstituted or substituted, for example by aliphatic groups, preferably $C_1$-$C_8$-alkyl groups, such as methyl, ethyl, i-propyl, n-propyl, n-butyl, i-butyl, s-butyl, n-pentyl, n-hexyl, n-heptyl, n-octyl, 2-ethylhexyl, OH, =O, $C_1$-$C_8$-alkoxy, COOH, $C_2$-$C_6$-carbalkoxy, $C_1$-$C_{10}$-acyloxy, or $C_1$-$C_8$-alkylamino, sulfonic acid or salts thereof, such as alkali or alkaline earth metal salts, cyano or halogens, such as fluorine, chlorine, bromine. Examples of substituted chain regulators are sulfoisophthalic acid and alkali or alkaline earth metal salts thereof, such as lithium, sodium or potassium salts, sulfoisophthalic esters, for example with $C_1$-$C_{16}$-alkanols, or sulfoisophthalic acid mono- or diamides, especially with monomers suitable for forming polyamides and bearing at least one amino group, such as hexamethylenediamine or 6-aminocaproic acid.

Preferred chain regulators are sterically hindered piperidine derivatives of the formula

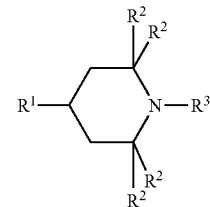

where
$R^1$ is a functional group capable of amide formation with the polymer chain of the polyamide,
  preferably a group —(NH)$R^5$, in which $R^5$ is hydrogen or $C_1$-$C_8$ alkyl, or a carboxyl group, or a carboxyl derivative, or a group —(CH$_2$)$_x$(NH)$R^5$, in which x is 1 to 6 and $R^5$ is hydrogen or $C_1$-$C_8$ alkyl, or a group —(CH$_2$)$_y$COOH, in which y is 1 to 6, or a —(CH$_2$)$_y$COOH acid derivative, in which y is 1 to 6,
  especially a group —NH$_2$,
$R^2$ is an alkyl group, preferably a $C_1$-$C_4$ alkyl group such as methyl, ethyl, n-propyl, i-propyl, n-butyl, i-butyl, s-butyl, t-butyl,
  especially a methyl group,
$R^3$ is hydrogen, $C_1$-$C_4$ alkyl or O—$R^4$, in which $R^4$ is hydrogen or $C_1$-$C_7$ alkyl, $R^3$ being hydrogen in particular.

In such compounds, steric hindrance usually prevents the tertiary amino groups, and especially the secondary amino groups, of the piperidine ring systems from reacting.

A particularly preferred sterically hindered piperidine derivative is 4-amino-2,2,6,6-tetramethylpiperidine.

A chain regulator may advantageously be used in amounts of not less than 0.001 mol %, preferably not less than 0.01 mol %, especially not less than 0.03 mol % and more preferably not less than 0.08 mol %, based on 1 mol of acid amide groups of the polyamide.

A chain regulator may advantageously be used in amounts of not more than 2.0 mol %, preferably not more than 1 mol %, especially not more than 0.6 mol %, and more preferably not more than 0.5 mol %, based on 1 mol of acid amide groups of the polyamide.

In accordance with the present invention, the main chain of the polyamide contains a chemically bound amine selected from the group consisting of 2-methyl-1,5-diamino-pentane and 1-amino-2-R-cyclopent-1-ene, where R is a functional group capable of combining with an amino group to form an amide group.

Whenever the present invention refers to the amine mentioned, the term shall comprehend not only such an amine but also a mixture of such amines.

2-Methyl-1,5-diaminopentane and processes for preparing this compound are known. For instance, 2-methyl-1,5-diaminopentane may be obtained by hydrogenation of 2-methylglutaronitrile, which in turn is by-produced in appreciable amounts in industrial adiponitrile synthesis by double hydrocyanation of butadiene.

According to the present invention, R in the amine 1-amino-2-R-cyclopent-1-ene is a functional group capable of combining with an amino group to form an amide group. Advantageously, R is a functional group selected from the group consisting of carboxylic acid (COOH), carboxylic ester, carboxylic amide and nitrile (CN), especially nitrile, or mixtures thereof.

When R represents a carboxylic ester, such as an ester of an aromatic and preferably aliphatic alcohol, especially $C_1$ to $C_{16}$ alcohol, it is a particularly preferred embodiment for R to be able to represent a carboxylic ester selected from the group consisting of methyl ester, ethyl ester, n-propyl ester, i-propyl ester, n-butyl ester, s-butyl ester, i-butyl ester and t-butyl ester or mixtures thereof, especially methyl ester.

When R represents carboxylic amide, the carboxylic amide may be unsubstituted and thus R may represent the group $CONH_2$, or be substituted by one or two aromatic and preferably aliphatic radicals, especially $C_1$ to $C_{16}$ radicals, more preferably selected from the group consisting of methyl, ethyl, n-propyl, i-propyl, n-butyl, s-butyl, i-butyl or t-butyl or mixtures thereof, especially methyl, such as N-methylamide or N,N-dimethylamide.

The preparation of amine 1-amino-2-R-cyclopent-1-ene having the designated meanings for R is known per se. For instance, 1-amino-2-cyanocyclopent-1-ene may be obtained by internal cyclization of adiponitrile. The other suitable compounds may be obtained for example by converting the cyano group in 1-amino-2-cyanocyclopent-1-ene by conventional methods, as by partial or complete hydrolysis of the cyano group.

The level of amine selected from group consisting of 2-methyl-1,5-diaminopentane and 1-amino-2-R-cyclopent-1-ene, where R is a functional group capable of combining with an amino group to form an amide group, may advantageously be not less than 0.001 mol %, preferably not less than 0.01 mol %, especially not less than 0.03 mol % and more preferably not less than 0.08 mol %, based on 1 mol of acid amide groups of the polyamide.

The level of amine selected from group consisting of 2-methyl-1,5-diaminopentane and 1-amino-2-R-cyclopent-1-ene, where R is a functional group capable of combining with an amino group to form an amide group, may advantageously be not more than 2.0 mol %, preferably not more than 1 mol %, especially not more than 0.6 mol % and more preferably not more than 0.5 mol %, based on 1 mol of acid amide groups of the polyamide.

The polyamides of the present invention are obtainable in a process which comprises converting monomers, oligomers or mixtures thereof suitable for forming a polyamide into a polyamide in the presence of an amine selected from the group consisting of 2-methyl-1,5-diaminopentane and 1-amino-2-R-cyclopent-1-ene, where R is a functional group capable of combining with an amino group to form an amide group.

The polyamides of the present invention may be prepared using the process conditions customary for preparing polyamides from the corresponding monomers, as described for example in DE-A-14 95 198, DE-A-25 58 480, EP-A-129 196, DE-A-19 709 390, DE-A-35 34 817, WO 99/38908, WO 99/43734, WO 99/43732, WO 00/24808, WO 01/56984 or in Polymerization Processes, Interscience, New York, 1977, pages 424-467, especially pages 444-446.

In a preferred embodiment, the polymerization or polycondensation of the process according to the present invention may be carried out in the presence of at least one pigment. Preferred pigments are titanium dioxide, preferably in the anatase or rutile crystal form, or inorganic or organic colored compounds. The pigments are preferably added in an amount from 0 to 5 parts by weight and especially from 0.02 to 2 parts by weight, based in each case on 100 parts by weight of polyamide. The pigments may be added to the reactor with the starting materials or separately therefrom.

Furthermore, the polyamides may be prepared not only by the two, preferred processes mentioned but also by anionic polymerization.

An anionic polymerization process typically comprises reacting
a) a lactam or a mixture of lactams,
b) a lactamate or a compound which releases a lactamate from a lactam as per a), or mixtures of such components, and
c) a polymerization-regulating activator mixed with one another to obtain a polyamide.

Processes for anionic polymerization of lactams, also known as alkaline polymerization of lactams, and also suitable compounds a), b) and c) are general common knowledge, for example from U.S. Pat. No. 3,206,418, U.S. Pat. No. 3,207,713, U.S. Pat. No. 3,494,999, U.S. Pat. No. 3,793,255, U.S. Pat. No. 4,233,433, U.S. Pat. No. 4,393,193, U.S. Pat. No. 4,503,014, U.S. Pat. No. 5,747,634, WO-A-00/58387, WO-A-01/49906, International Polymer Processing 16(2)-(2001) 172-182 or Fourné, Synthetische Fasern, Carl Hanser Verlag, Munich/Vienna, 1995, pages 38-39.

The polyamides of the present invention may advantageously be used for producing fibers, films and moldings comprising such a polyamide or, more specifically, consisting of such a polyamide.

EXAMPLES

The solution viscosity reported in the examples was measured as a relative solution viscosity in 96% sulfuric acid as per DIN 51562-1 to -4.

Specifically, 1 g of polymer was weighed out per 100 ml of solution and the flow time was measured in a Ubbelohde viscometer against the pure solvent.

Inventive Example 1

In a pressure vessel, 500 kg (4 419 mol) of caprolactam, 50 kg of completely ion-free water and 1 046 g (9 mol) of 2-methyl-1,5-diaminopentane were heated under nitrogen to an internal temperature of 270° C., immediately thereafter let down to atmospheric over an hour, supplementarily condensed for 60 minutes and discharged. The discharged polyamide was extracted, dried and heat-treated in the solid state to a relative solution viscosity of RV=2.70.

Comparative Example 1

Inventive example 1 was repeated except that 1 046 g (9 mol) of hexamethylene-diamine were added instead of 2-methyl-1,5-diaminopentane. The solution viscosity after heat treatment was RV=2.71.

Inventive Example 2

Inventive example 1 was repeated except that 973 g (9 mol) of 1-amino-2-cyanocyclopent-1-ene were added instead of 2-methyl-1,5-diaminopentane. The solution viscosity after heat treatment was RV=2.69.

Comparative Example 2

Inventive example 1 was repeated except that 1 081 g (9 mol) of 6-aminocaproic acid were added instead of 2-methyl-1,5-diaminopentane. The solution viscosity after heat treatment was RV=2.70.

Example 3

The polymers from inventive examples 1 and 2 and from comparative examples 1 and 2 were spun into standard 44 dtex 12 filament round profile yarn at 5 500 m/min on an Inventa pilot spinning plant by the H4S process at identical machine settings. The draw ratio was 1.40:1. The textile yarns thus produced were each then processed on a Lawson Hemphill FAK 3.5 circular knitting machine into a knit tube having the same yarn weight. The knit tube specimens of inventive example 1 and comparative example 1 and also of inventive example 2 and comparative example 2 were then each dyed jointly in a single dyebath with a commercially available metallized dye (0.3% of Acidol black MSRL, liquor ratio 20:1, 1.0% of Uniperol AC, pH 7, starting temperature 40° C., heating to 98° C. at 1.5°/min, 60 min at 98° C., rinsing with warm water, drying). The relative depth of shade (color intensity) of the two knits was subsequently determined using an Optronic Colorflash C22S spectrophotometer by the Kubelka-Munk method in line with DIN 53234 "Determination of relative color intensity".

TABLE 1

Relative color intensity of yarns [%] after competitive dyeing

| Inventive example 1 | Comparative example 1 | Inventive example 2 | Comparative example 2 |
|---|---|---|---|
| 250 | 100 * | 260 | 100 * |

* standardized to 100%

Table 1 reveals that yarns produced from polyamides of inventive examples 1 and 2 are dyed distinctly deeper in a competitive dyeing with yarns of the polyamides from the respective comparative examples 1 and 2.

To achieve a predetermined depth of shade on yarns, yarns from polyamides as per inventive examples 1 and 2 accordingly need shorter residence times in dyebaths by virtue of their higher rate of dyeing than yarns from polyamides as per the prior art. Thus, higher processing speeds are achievable when dyeing yarns from polyamides as per inventive examples 1 and 2 than for yarns from polyamides as per the prior art. It was an object of the present invention to provide a polyamide which has a higher rate of dyeing than prior art polyamides and also a process for preparing such a polyamide.

We claim:

1. A polyamide whose main chain comprises chemically bound 1-amino-2-R-cyclopent-1-ene wherein R is a functional group capable of combining with an amino group to form an amide group and wherein R is present at a level in the range from not less than 0.08 mol %, to 2 mol %, based on 1 mol of acid amide groups of said polyamide,
   wherein R is selected from the group consisting of carboxylic acid and carboxylic ester.

2. The polyamide according to claim 1 wherein R represents carboxylic acid.

3. The polyamide according to claim 1 wherein R represents carboxylic ester.

4. The polyamide according to claim 3 wherein R represents a carboxylic ester selected from the group consisting of methyl ester, ethyl ester, n-propyl ester, i-propyl ester, n-butyl ester, s-butyl ester, i-butyl ester and t-butyl ester.

5. The polyamide according to claim 1 wherein the main chain of said polyamide comprises chemically bound 2-methyl-1,5-diaminopentane.

6. A process for preparing a polyamide, which comprises converting monomers suitable for forming a polyamide in the presence of 1-amino-2-R-cyclopent-1-ene, where R is a functional group, according to claim 1.

7. A process for preparing a polyamide, which comprises converting oligomers suitable for forming a polyamide into a polyamide in the presence of 1-amino-2-R-cyclopent-1-ene, where R is a functional group, according to claim 1.

8. Fibers, films and moldings comprising a polyamide according to claim 1.

9. A process for preparing a polyamide, which comprises converting monomers suitable for forming a polyamide in the presence of 1-amino-2-R-cyclopent-1-ene, where R is a functional group selected from the group consisting of a carboxylic acid and a carboxylic ester, and the main chain of said polyamide comprises chemically bound 1-amino-2-R-cyclopent-1-ene wherein R is present at a level in the range from not less than 0.08 mol % to 2 mol %, based on 1 mol of acid amide groups of said polyamide.

10. A process for preparing a polyamide, which comprises converting oligomers suitable for forming a polyamide in the presence of 1-amino-2-R-cyclopent-1-ene, where R is a functional group is selected from the group consisting of carboxylic acid and a carboxylic ester and the main chain of said polyamide comprises chemically bound 1-amino-2-R-cyclopent-1-ene wherein R is present at a level in the range from not less than 0.08 mol % to 2 mol %, based on 1 mol of acid amide groups of said polyamide.

11. A polyamide whose main chain comprises chemically bound 1-amino-2-R-cyclopent-1-ene wherein R is selected from the group consisting of a carboxylic acid and a carboxylic ester, and R is present at a level in the range from not less than 0.08 mol % to 2 mol %, based on 1 mol of acid amide groups of said polyamide.

12. The polyamide according to claim 11 wherein R represents carboxylic acid.

13. The polyamide according to claim 11 wherein R represents carboxylic ester.

* * * * *